(12) United States Patent
French et al.

(10) Patent No.: US 7,133,125 B2
(45) Date of Patent: Nov. 7, 2006

(54) AUTOMATED SYSTEM AND METHOD FOR DETERMINING THE SENSITIVITY OF OPTICAL COMPONENTS

(75) Inventors: John Sargent French, Palm, PA (US); William Joseph Thompson, Kempton, PA (US)

(73) Assignee: Circadiant Systems, Inc., Allentown, PA (US)

(*) Notice: Subject to any disclaimer, the term of this patent is extended or adjusted under 35 U.S.C. 154(b) by 0 days.

(21) Appl. No.: 10/613,299

(22) Filed: Jul. 2, 2003

(65) Prior Publication Data

US 2004/0004711 A1    Jan. 8, 2004

Related U.S. Application Data

(63) Continuation of application No. PCT/US02/12816, filed on Apr. 23, 2002, and a continuation of application No. PCT/US02/12819, filed on Apr. 23, 2002, application No. 10/613,299.

(60) Provisional application No. 60/285,805, filed on Apr. 23, 2001, provisional application No. 60/285,804, filed on Apr. 23, 2001.

(51) Int. Cl.
*G01N 21/00* (2006.01)
(52) U.S. Cl. .................................... 356/73.1
(58) Field of Classification Search ............ 356/73.1, 356/300–334; 250/237 G, 573–577, 343–346, 250/227.11–227.32
See application file for complete search history.

(56) References Cited

U.S. PATENT DOCUMENTS

| | | | |
|---|---|---|---|
| 5,148,230 A * | 9/1992 | Lane et al. | 356/73.1 |
| 5,566,088 A | 10/1996 | Herscher et al. | 364/514 B |
| 5,652,668 A | 7/1997 | Aulet et al. | 359/110 |
| 5,761,216 A | 6/1998 | Sotome et al. | |
| 5,841,667 A | 11/1998 | Martin | 364/551.01 |
| 5,969,840 A | 10/1999 | Roberts | 398/32 |
| 6,005,696 A * | 12/1999 | Joline et al. | 398/25 |
| 6,069,697 A * | 5/2000 | Tanimoto et al. | 356/327 |
| 6,115,157 A | 9/2000 | Barnard et al. | 398/1 |
| 6,137,830 A | 10/2000 | Schneider et al. | |
| 6,456,608 B1 | 9/2002 | Lomp | 370/335 |
| 6,580,531 B1 * | 6/2003 | Swanson et al. | 398/5 |
| 6,590,644 B1 | 7/2003 | Coin et al. | |
| 6,614,735 B1 | 9/2003 | Shoji et al. | 369/47.3 |
| 6,847,788 B1 | 1/2005 | Nakajima et al. | 398/149 |

* cited by examiner

*Primary Examiner*—Tu T. Nguyen

(57) ABSTRACT

A system and method for testing the sensitivity of optical components comprises providing an optical testing unit which measures the sensitivity of an optical device under test (DUT). The optical testing unit includes an optical transmitter, which transmits an optical test signal that is transmitted to the DUT; an optical receiver, which receives an input signal from the DUT; a graphical user interface, which provides an interface with a user; and a controller, selectively coupled to the transmitter, the receiver and the graphical user interface, wherein the controller provides a central control of the transmitter, the receiver and the graphical user interface.

18 Claims, 8 Drawing Sheets

AUTOMATED SYSTEM AND METHOD FOR DETERMINING THE SENSITIVITY OF OPTICAL COMPONENTS

CROSS REFERENCE TO RELATED APPLICATIONS

The present application is a continuation of and claims priority under 35 U.S.C. § 365(c) and 35 U.S.C. §120 from international patent applications PCT/US02/12816 and PCT/US02/12819, entitled "Automated System and Method For Performing Bit Error Rate Measurements On Optical Components" and "Automated System and Method For Determining the Sensitivity of Optical Components," respectively; and each being filed on Apr. 23, 2002. These international applications claim priority from U.S. provisional patent applications Nos. 60/285,805 and 60/285,804, both filed Apr. 23, 2001 respectively. Thereby priority under 35 U.S.C. §119(e) is claimed. The disclosures of each of the referenced applications are specifically incorporated by reference herein.

BACKGROUND

Optical components, including fiber optic cables, connectors, transmitters, receivers, switches, routers and all other types of optical components have become the backbone of the modern telecommunication infrastructure. Due to their extremely low error rate and wide bandwidth, optical communication systems have supported an explosion in the growth of data communication systems, such as the Internet. With the Internet in its infancy, it is expected that the reliance on optical components and systems will only increase as the Internet becomes more closely intertwined with mainstream business and consumer applications.

Although the technology associated with optical communication systems and components has greatly advanced over the last decade and the use of such technology has accelerated, the technology associated with testing optical communication systems and components has greatly lagged.

Bit error rate (BER) measurements are a standard tool in verifying the performance of any digital optical communication system. Nevertheless, such tests remain an underutilized resource in understanding and diagnosing issues with such systems; particularly with respect to the receive-side optical front end. There are many contributing factors to this situation; chief among them are a lack of hardware and software resources, the time consuming nature of such measurements, and a lack of appreciation and understanding of the information content such measurements can provide.

The principle of BER measurements is simple: send digital data through a device and compare the digital result to the input data. The BER is given by the ratio of incorrectly identified bits to the total number of bits processed. In optical systems, BER tests are most commonly associated with determining the sensitivity of the optical receiver. Clearly, if the input optical power decreases enough, the receiver will begin generating errors. Receiver sensitivity is the input optical power required for a particular BER. Sensitivity is typically measured in dBm where:

$$P_{dBm} \equiv 10\log\left(\frac{P \text{ mW}}{1 \text{ mW}}\right) \quad \text{Eqn. (1)}$$

Accordingly, 0 dBm corresponds to 1 mW. The result depends strongly on the measurement conditions including the quality of the transmitter, the amount of input optical noise, the BER required, the data rate and the data being transmitted. A typical measurement might involve a high quality transmitter, no added input noise, a well-defined pseudorandom bit sequence and a required BER of $1\times10^{-10}$.

For a network designer, sensitivity is often regarded as the most important figure of merit for a receiver since it suggests a minimum input operating power for the device. A designer would ordinarily plan to operate the receiver with an input power high enough above the quoted sensitivity such that the expected error rate will not impact the reliability of the link. But how high above the sensitivity power level the receiver should be operated at is one of the fundamental questions that careful BER measurements can answer.

Due to the current state of technology for optical testing equipment, testing an optical component at many small increments of optical power over the full operating range is not realistic. To wit, via current practices, in order to perform these measurements, it is often necessary for a technician first to set the optical power of the test equipment to the desired optical power (which is an iterative process), and then must separately measure the number of errors at that optical power. Since the number of errors exhibited by optical equipment is extremely low, (i.e., $1\times10^{-9}$ or less), it would necessitate a technician to continually attend to the testing equipment over a series of hours or days.

Known testing regimens avoid the problem of lengthy test procedures by requiring a technician to measure the BER over a few discrete levels of optical power. These results are then extrapolated throughout the entire operating range of the optical component to arrive at the behavior of the component over the entire operating range of the component. Extrapolating the results in such a manner increases the risk that the true behavior exhibited by the optical component at levels of power between the measured discrete levels will be missed. This can lead to later errors in the technical specifications for the particular component.

What is needed is a simple and effective system and method for efficiently testing the sensitivity of optical components.

SUMMARY

According to an exemplary embodiment, an optical testing unit measures the sensitivity of an optical device under test (DUT) over an operating range of the DUT. The optical testing unit includes an optical transmitter, which transmits an optical test signal that is transmitted to the DUT; an optical receiver, which receives an input signal from the DUT; a graphical user interface, which provides an interface with a user; and a controller, selectively coupled to the transmitter, the receiver and the graphical user interface, wherein the controller provides a central control of the transmitter, the receiver and the graphical user interface.

According to another exemplary embodiment, a method of measuring the sensitivity of an optical component includes: providing an optical testing unit; providing a test optical signal as an output signal to a device under test (DUT); receiving an input signal from the DUT; measuring the BER from the input signal; comparing the measured BER with a stored BER; adjusting a power level of the test optical signal based upon the comparison and providing a control unit which controls various components in the optical test unit.

Objects and advantages of the system and the method will become apparent to those skilled in the art after reading a detailed description of the presently preferred embodiment.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

Figure 1:
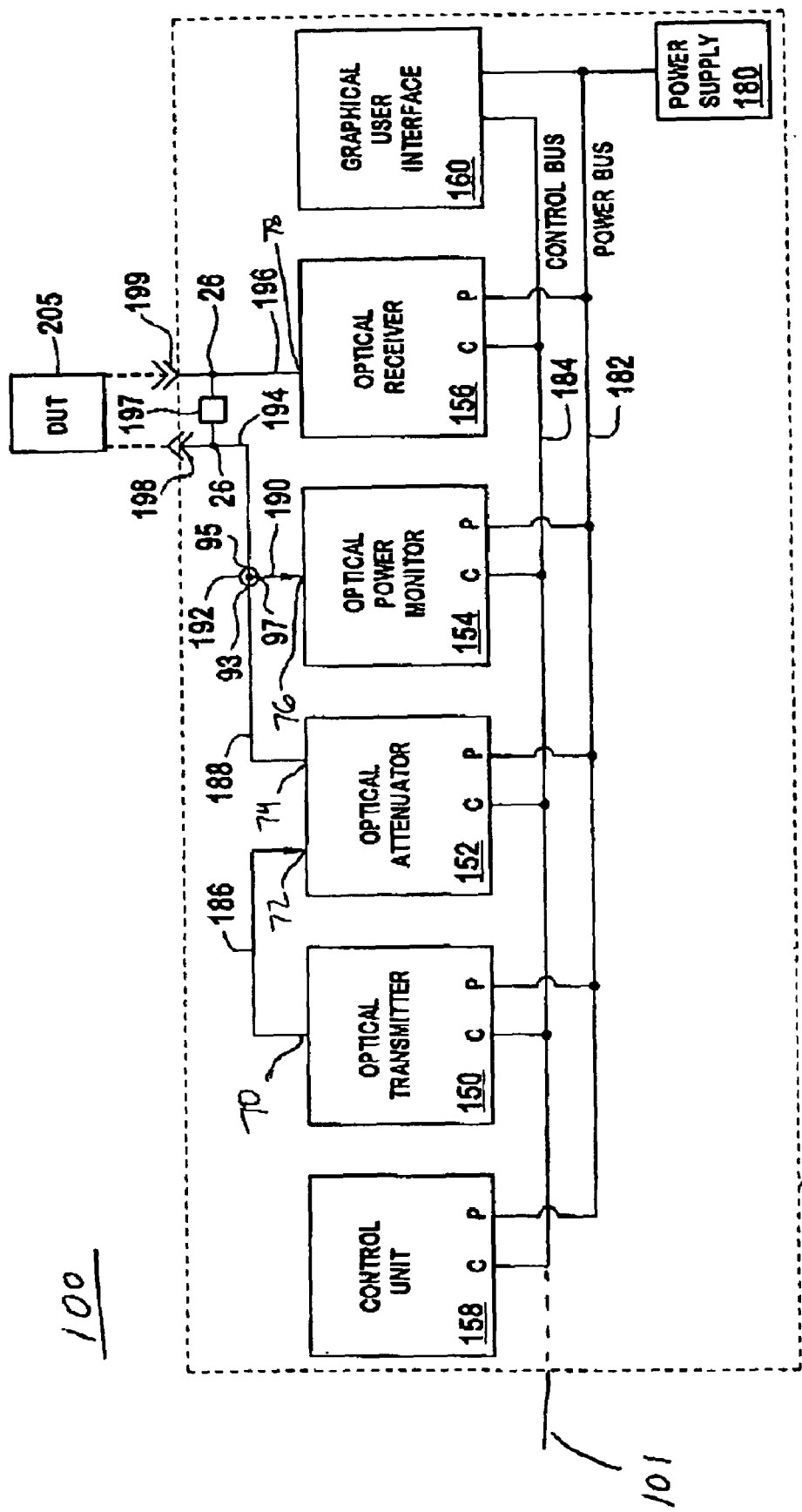
FIG. 1 is a block diagram of an exemplary embodiment of the present invention.

In the following detailed description, for purposes of explanation and not limitation, exemplary embodiments disclosing specific details are set forth in order to provide a thorough understanding of the present invention. However, it will be apparent to one having ordinary skill in the art that the present invention may be practiced in other embodiments that depart from the specific details disclosed herein. In other instances, detailed descriptions of well-known devices and methods may be omitted so as not to obscure the description of the present invention. Wherever possible, like reference numerals refer to like elements.

Briefly, as described in connection with exemplary embodiments herein, the present invention relates to a unitary optical testing apparatus and method for performing measurement and testing of optical components. These measurements and testing are illustratively performed to determine the sensitivity, or BER, or both of the optical components. Usefully, a single control unit automates calibration and testing via the unitary optical testing apparatus. This automation enables a technician to perform the measurement and testing in a rapid, efficient and accurate manner when compared to known measurement and testing schemes.

FIG. 1 shows a block diagram of an optical testing unit 100 in accordance with an exemplary embodiment of the present invention. The optical testing unit 100 illustratively includes an optical transmitter 150, an optical attenuator 152, an optical power monitor 154, an optical receiver 156, a control unit 158, an optical splitter 192 and a graphical user interface (GUI) 160. Illustratively, all of the optical components may be disposed in a housing 104. The optical testing unit 100 may also include fiber optic cables 186, 188, 190, 194, 196 and optical output and inputs 198, 199 between the optical testing unit 100 and a device under test (DUT) 105.

The optical testing unit 100 of the exemplary embodiment is optimized by including a common control bus 184 and a common power bus 182, which is coupled to a central power supply 180. Each active component 150–160 within the optical testing unit is coupled to both the control bus 184, via a control (C) interconnection, and to the power bus 182 via a power (P) interconnection. This permits the elimination of redundant power supplies and power feeds to each separate component, permits a single control bus to control all of the components 150–160, and eliminates all redundant user interfaces with each optical component.

A single control unit 158 is useful in the automated measurement and testing of the DUT 105. Beneficially, having a single control unit 158 providing selective control of each optical component 150–156 greatly simplifies the testing procedure. For example, having a single control unit 158 also permits calibration of the entire optical testing unit from a common point of control. This and other benefits will become clearer as the present description continues.

Illustratively, all of the optical components 150–156 are fixed in a rigid spatial relationship. Also the optical cables 186, 188, 190, 194, 196 are also rigidly fixed to prevent an inadvertent degradation or complete separation of an interconnection between optical components.

In the exemplary embodiments described herein, each of the optical components 150–156 may also include one or more optical interfaces. For example, the optical transmitter 150 may include an optical output 70. The optical attenuator 152 may include an optical input 72 and also an optical output 74. The optical power monitor 154 may include an optical input 76, and the optical receiver 156 may include an optical input 78. The optical splitter 192 may include an optical input 93 and two optical outputs 95, 97. The housing 104 may include an optical output port 198 and an optical input port 199. Illustratively, the optical output port 198 is coupled with the input of the DUT 205 and the optical input port 199 is coupled with the output of the DUT 205.

The control unit 158 may be configured to control the various components of the optical testing unit 100 in order to affect different types of measuring and testing. In accordance with a first embodiment described presently, the control unit usefully enables BER testing; and in a second embodiment described herein, the control unit usefully enables sensitivity testing and measurements. As can be appreciated, the types of measurements and testing techniques controlled by the control unit 158 disclosed via the exemplary embodiments are intended to be illustrative and not limit the scope of the invention. It is thus noted that the control unit 158 may be configured to affect (via interaction with various components of the optical testing unit 100) the traffic being generated (protocol, binary sequence, etc.), the traffic rate (i.e., bit rate), and the optical power (expressed in a variety of ways including, but not limited to, average optical power and Optical Modulation Amplitude). Using facilities within the optical testing unit 100, the control unit 158 can also examine the signal coming from the DUT and determine the BER either by considering the traffic bit by bit or by examining any coding scheme embedded within the traffic which provides indications that transmission errors have occurred.

Figure 2:
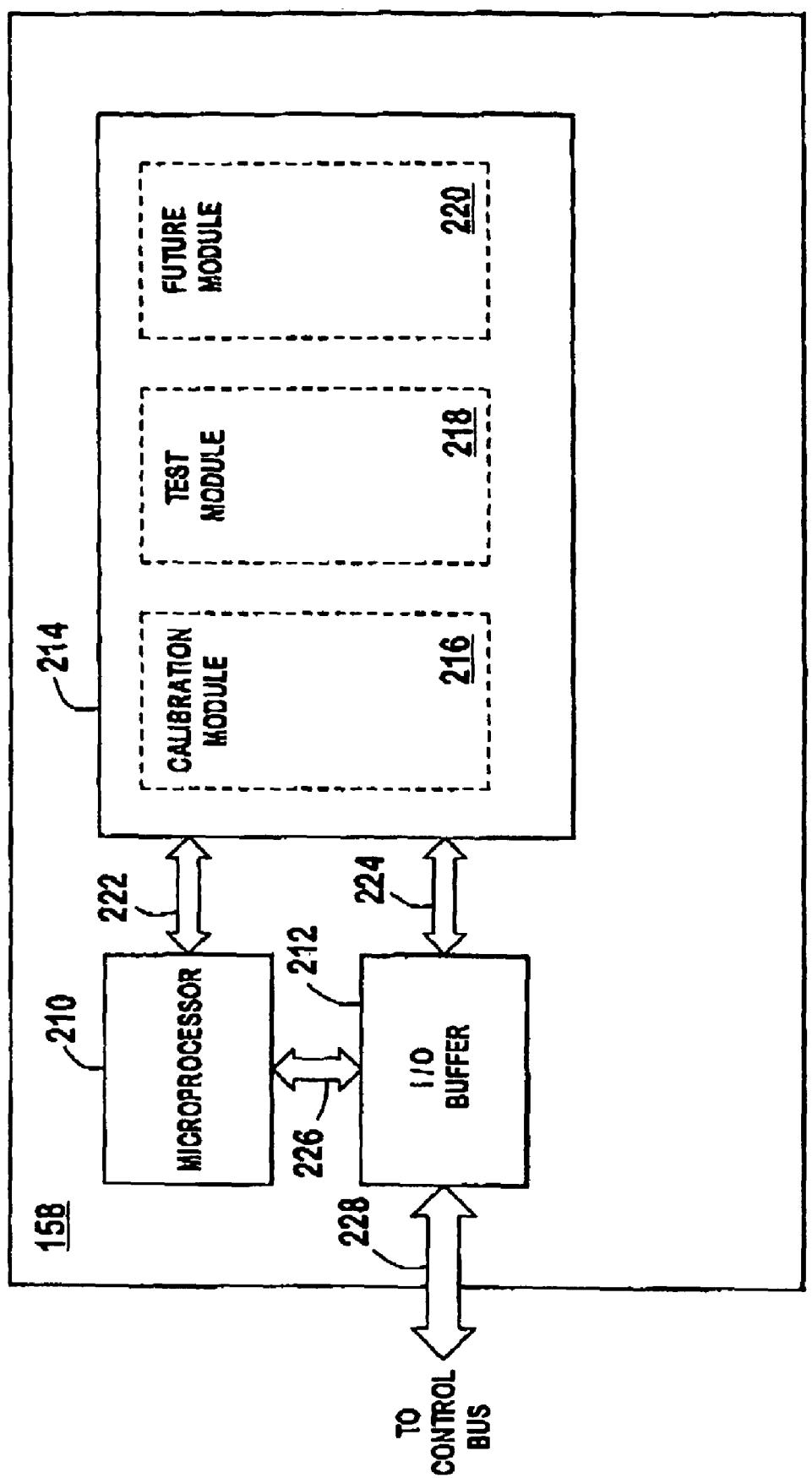
FIG. 2 is a block diagram of a control unit in accordance with an exemplary embodiment of the present invention.

Referring to FIG. 2, the control unit 158 according to an exemplary embodiment is shown in greater detail. The control unit 158 illustratively includes a microprocessor 210, an input/output (I/O) buffer 212, and an associated memory 214. Microprocessor 210 should of course be able to control various hardware and obtain data therefrom. The memory 214 permits storage of a plurality of individual software modules, predetermined component test parameters and any other information which is required to be stored by the control unit 158. For example, the memory 214 includes a calibration module 216 and a test module 218. The memory 214 may also include spare capacity or may be expanded by adding additional memory capacity for future modules 220. Although these modules 216–220 have been shown and described as separate components for ease of explanation in the present embodiment, it is noted that this is merely illustrative. To wit, these modules are resident in software and the software may be stored, and the memory 214 partitioned, as desired by the technician. Calibration module 216 provides for the calibration of optical test unit 100 as a system, as opposed to each individual element 150–156. Test module 218 is a conglomeration of individual software algorithms that control the hardware within optical testing unit 100, record bit error rate data, analyze that data and display results of the analysis. The procedures affected by modules 216 and 218 will be discussed in detail later with reference to FIGS. 3 and 4, respectively.

Illustratively, data buses 222, 224, 226 affect the flow of data between the microprocessor 210; the memory 214 and the I/O buffer 212. Another data bus 228 facilitates the flow of data between the I/O buffer 212 and the control bus 184. Alternatively, the data bus 228 may be deleted and the I/O buffer 212 be coupled directly to the control bus 184. Although the microprocessor 158 is illustrated herein as including an I/O buffer 212, in an alternative embodiment of the present invention, the control unit 158 provides for direct access to the memory 214 such that the I/O buffer 212 is not required. Of course, any accessing of the memory 214 in that embodiment may be monitored and/or controlled by the microprocessor 210.

Figure 3:
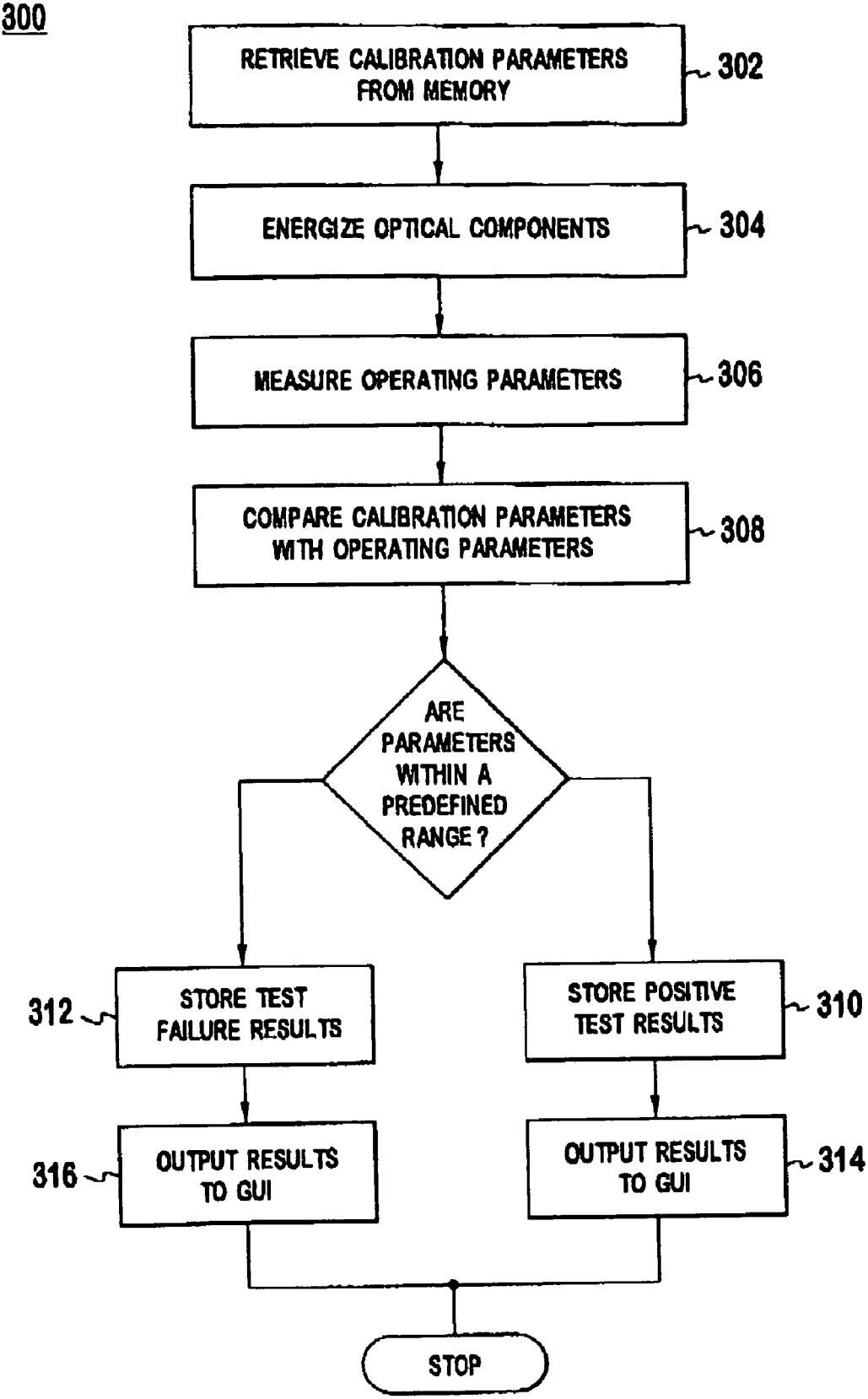
FIG. 3 is a flow chart of a calibration procedure in accordance with an exemplary embodiment of the present invention.
Figure 4:
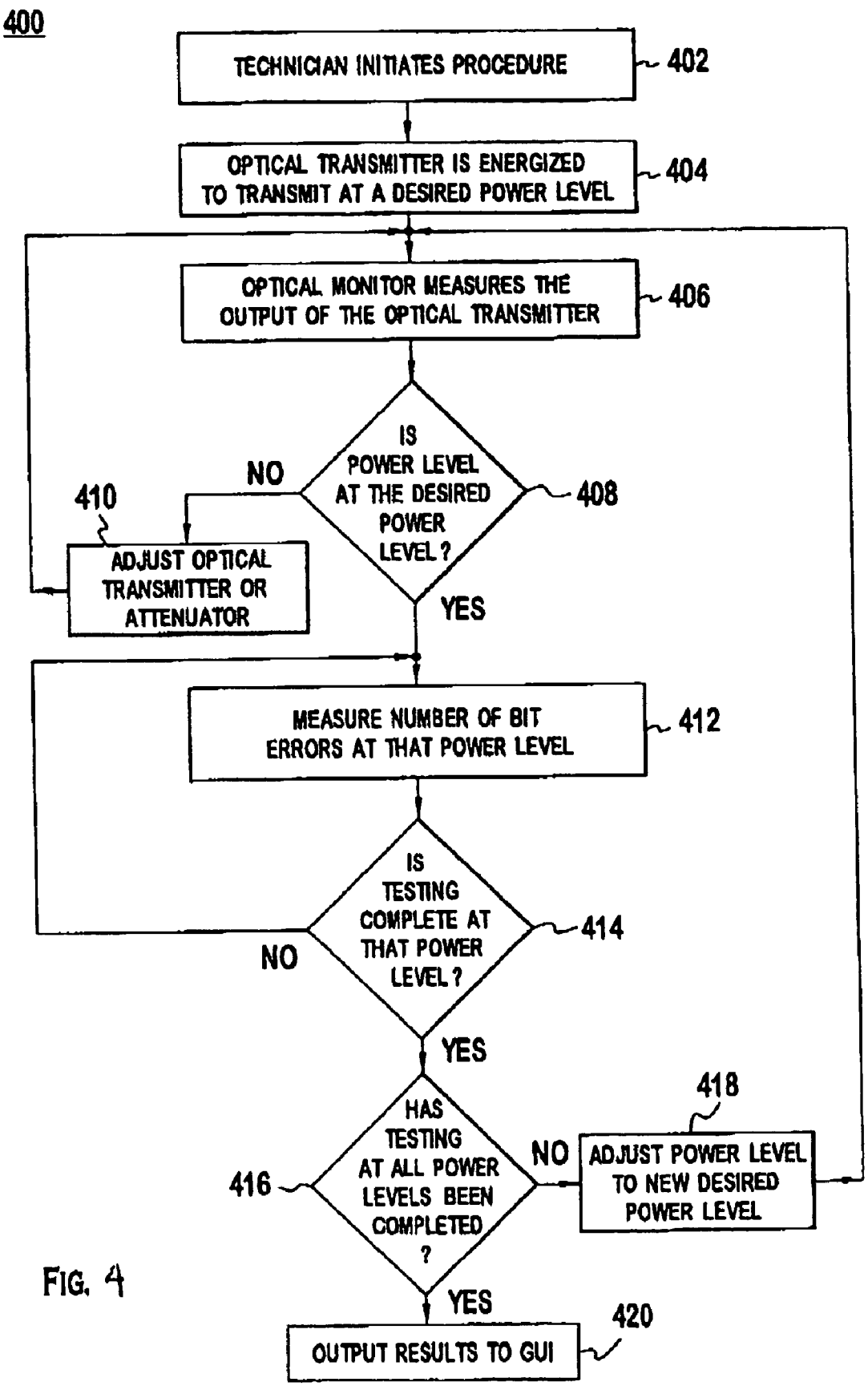
FIG. 4 is a flow chart of a test procedure in accordance with an exemplary embodiment of the present invention.

The process implemented by the individual modules will now be described in greater detail with reference to FIGS. 3 and 4. Referring initially to FIG. 3, a calibration procedure 300 in accordance with an exemplary embodiment of the present invention is shown. This calibration procedure is useful in realizing BER measurements of the present exemplary embodiment. There is a need to be able to calibrate the optical testing unit 100 via either internal or external means. It is preferable that it is calibrated as a system and not as individual units, such as the optical transmitter 150 and the optical receiver 156. By calibrating it as a system, optical testing unit 100 is more accurately reliable than a system made up of individually calibrated stand-alone components.

It is noted that similar calibration procedures with subject specific variations may be used to calibrate optical testing unit 100 to realize differing measurements and tests. Additionally, it is noted that the control unit 158 can directly control external instrumentation to measure aspects of the transmitted or received signal to allow calibration of the optical testing unit 100. Alternatively, measurements can be made completely independent of the control unit 158 (either manually or under the control of an external computer) and subsequently communicated to the control unit 158 to affect the calibration of the optical testing unit 100.

It is noted that in order to calibrate optical testing unit 100, an external optical jumper (not shown) may be placed between the optical output port 198 and the optical input port 199. This completes the optical path between the optical transmitter 150 and the optical receiver 156. Alternatively, an internal optical switch 197 may be provided to switch the output of the optical attenuator 152 to the input of the optical receiver 156. Illustratively, optical switch 197 is automatically controlled by the control unit 158 when the calibration procedure 300 is implemented. Alternatively, the optical switch 197 could be manually operated. Use of the optical switch 197 is beneficial since it eliminates the need for a technician to install an external optical jumper and eliminates any degradation problems caused by a damaged external optical jumper.

The calibration procedure 300 begins with the control unit 158 retrieving pre-stored optical transmitter calibration parameters from memory (step 302). The calibration parameters may be either predefined values stored in memory by a technician; may be factory settings for the optical components 150–160; may be the results of prior calibration tests; or may be a combination thereof. The control unit 158 then energizes all of the optical components (step 304); and, after a predetermined duration, which permits the electronic components therein to reach steady state, the control unit 158 measures the operating parameters, which comprise the optical output power and the internal BER (step 306).

The control unit 158 then compares the calibration parameters to the measured operating parameters (step 308). If the operating parameters are within a predefined range of the calibration parameters, the control unit 158 stores the positive test results (step 310). If the operating parameters are not within the predetermined range of the calibration parameters, the system has failed the calibration procedure 300 and the control unit 158 stores this failure 312. Preferably, as the control unit 158 receives the test results, whether pass or fail, the control unit 158 provides an output to the graphical user interface 160 to keep the technician apprised of the results of the procedure (steps 314, 316). If the system has failed, control unit 158 may (in conjunction with steps 312, 314 or in an additional step, not shown) adjust various aspects of optical testing unit 100, store any necessary information in memory 116, and may restart the calibration procedure at an appropriate step, such as step 306. This may be repeated until the system has passed.

It is noted that the steps 302–316 set forth in the calibration procedure 300 need not necessarily occur in the order set forth in FIG. 3; and that other calibration sequences may be followed, which may include the same number of steps, or more or fewer steps. For example, step 302 may occur between steps 306 and 308. Those of skill in the art would clearly recognize that there is flexibility in the ordering of some of these steps. Additionally, step 304, which relates to the energizing of the optical components, may be performed by the technician upon powering up the equipment. Moreover, steps 310 and 312 may be eliminated, whereby the results of the calibration procedure 300 are not stored. These alternative calibration sequences are merely illustrative, and other sequences may be followed in keeping with the present exemplary embodiment.

Once the calibration procedure 300 has been successfully completed, the optical testing unit 100 is ready to test an optical component. Referring back to FIG. 2, in order to implement the test procedure 400, the microprocessor 210 accesses the test module 218. The test procedure 400 is shown in greater detail in the flow diagram of FIG. 4. It is noted that the test procedure 400 may be fully automated, whereby the technician initiates the process (e.g., pushes a 'start button') and permits the control unit 158 to fully carry out the test procedure 400. Alternatively, the test procedure 400 may be selectively automated, whereby the technician may set certain parameters for the system to test. For example, the technician may set specific power levels for the system to test and may also set a specific number of errors, or range of uncertainty, at each power level. In any event, the present exemplary embodiment is implemented via the illustrative test procedure 400 shown in FIG. 4.

The test procedure 400 begins by the technician's initiating the procedure (step 402). This can be as simple as the technician's pushing a "start test" button on the graphical user interface 160, or by the technician's setting forth all of the individual testing parameters and pushing a "start test" button. The optical transmitter 150 is energized to transmit generally at a desired power level (step 404). Since the optical transmitter 150 is unable to fine-tune its output power level, additional steps 406–410 using the optical power monitor 154 and the optical attenuator 152 to iteratively fine-tune the output power level are desirable. The optical power monitor 154 measures the output of the optical transmitter 150 (step 406) and determines whether the output power level is at the desired power level (step 408). If the output power level is not at the desired power level, the optical attenuator 152 is tuned to attenuate the output of the optical transmitter 150 as appropriate in order to more closely achieve the desired power level (step 410). The optical testing unit then uses the optical power monitor 154 to again measure the output of the optical transmitter 150 (step 406). Steps 406–410 are repeated until the output power level is at the desired power level.

Once the desired power level has been achieved, the optical receiver 156 measures the number of bit errors at that specific power level (step 412). This step is performed until the "completion criteria" is met. The completion criteria may be a particular duration, a particular number of bit errors received, or attaining a particular uncertainty.

Regardless of which criteria is used to determine whether the testing is complete at that power level (step 414), the optical testing unit iteratively and continuously repeats steps 412 and 414 until the testing is complete for that particular power level. Once the testing is complete at the particular power level, the optical testing unit determines whether the testing for all power levels desired to be tested has been completed (step 416). If not, the optical testing unit adjusts the power level to the new desired power level (step 418) and the entire process (steps 406–416) is repeated until the testing at all power levels has been completed. The results are then output to the graphical user interface 160 (step 420).

The testing procedure 400 has many advantages over prior testing methods. First, because it is automated, optical testing unit 100 may operate autonomously without a technician having to perform all the functions manually. This saved time and effort.

Another advantage is that there are fewer uncertainties with testing procedure 400 than with the prior methods. The fact that the optical testing unit 100 is a single system having rigidly fixed internal components and optical cables yields less uncertainties with testing results than a group of individual stand-alone components. This is so because the true accuracy of the group of individual stand-alone components is unrealized because of all the loose interconnections.

Another advantage is that the test can proceed faster than individual stand-alone components automated with an external PC because all the components 150–156 are directly under the control of the control unit 158 and are built into optical testing unit 100 to work together.

Yet another advantage is that mathematical models of how BER should behave as a function of optical degradations can be stored in memory 214 and can be displayed to graphical user interface 160 in a meaningful way if desired. Optical testing unit 100 is specifically built to measure BER as a function of various optical degradations.

As mentioned previously, another exemplary embodiment of the present invention relates to measurement and testing of sensitivity of optical components. The optical testing unit 100 of the exemplary embodiment of FIG. 1 may be used to affect this type of measurement and testing. Accordingly, the common details of the various elements are not repeated in the interest of brevity. It is noted that a significant difference between the exemplary embodiments drawn to BER measurement and testing, and sensitivity measurement and testing lies in the substance and characteristics of the control unit 158.

Figure 5:
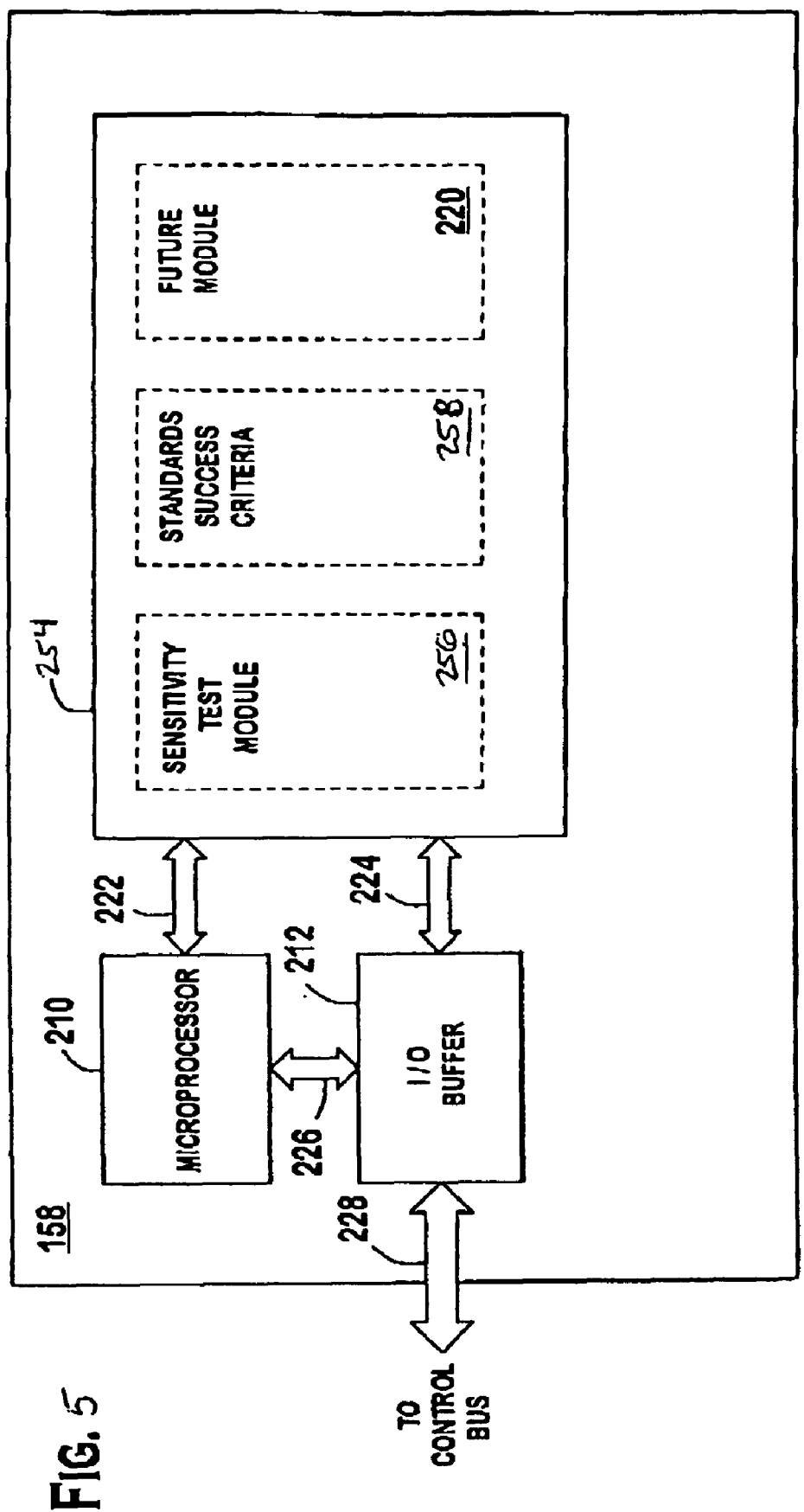
FIG. 5 is a block diagram of a control unit in accordance with an exemplary embodiment of the present invention.

Referring to FIG. 5, control unit 158 in accordance with an exemplary embodiment is shown. Control unit 158 of FIG. 5 is similar to that shown in FIG. 2. The control unit 158 includes a microprocessor 210, an input/output (I/O) buffer 212, and an associated memory 254. The memory 254, like memory 214 of FIG. 2, permits storage of all of the individual software modules, predetermined standard success criteria (optional) and any other information, which is required to be stored by the control unit 158. For example, the memory 254 includes a sensitivity test module 256 and standard success criteria 258. The memory 254 may also include enough room for future modules 220. Again, although these modules 256–258 and 220 have been graphically illustrated as separate components for ease of explanation in the present application, it should be recognized by those of skill in the art that these modules are resident in software and the software may be stored, and the memory 254 partitioned, as desired by the technician. Memory 254 may additionally contain any modules shown in the exemplary embodiment of FIG. 2, and memory 214 of FIG. 2 may contain any modules shown in the exemplary embodiment of FIG. 5. Additionally, it is noted that, as described above, bit error rate measurements are inherent in sensitivity testing and thus, sensitivity test module 256 may be comprised of parts or all of test module 218.

The sensitivity module 256 adjusts the traffic type and rate, adjusts the overall quality of the optical signal, and examines the traffic returning from the DUT to verify that it can recover information from it. It then varies the quality of the optical signal (the optical power of the signal) in controlled steps for a period of time controlled by the algorithm. Then for each step, the algorithm measures (or infers) the BER using assets within the optical testing device 100 and chooses whether or not to make any additional steps and the details of each of these steps. Throughout the data recording process, the algorithm analyzes the data. The algorithm also produces a graphical display of the measurement in progress and the results which may included whether or not the DUT passes requirements input by the user.

As with the previously described exemplary embodiment, several data buses 222, 224, 226 facilitate the flow of data between the microprocessor 210, the memory 254 and the I/O buffer 212. Another data bus 228 facilitates the flow of data between the I/O buffer 212 and the control bus 184. Alternatively, the data bus 228 may be deleted and the I/O buffer 212 be coupled directly to the control bus 184. Although the microprocessor 158 is illustrated herein as including an I/O buffer 212, in an alternative embodiment of the present invention, the control unit 158 provides for direct access to the memory 254 such that the I/O buffer 212 is not required. Of course, any accessing of the memory 214 in that embodiment will be monitored and/or controlled by the microprocessor 210.

The process implemented by the sensitivity test module 256 will now be described in greater detail with reference to FIG. 6. It is noted that all of the optical components 150–158 have been energized for a predetermined duration, which permits the electronic components therein to reach steady state. It should be noted that the sensitivity test procedure 600 may be fully automated, whereby the technician initiates the process by pushing a button, which permits the control unit to fully carry out the sensitivity test procedure 600. In this embodiment, the control unit 158 will select a default error rate and a default "error range" within which the sensitivity must be measured. Alternatively, the sensitivity test procedure 600 may be selectively automated, whereby the technician may set certain parameters for the optical testing unit to implement the test. For example, the technician may set specific power levels for the optical testing unit to test and may also set a specific error range within which the sensitivity must be measured.

In any event, the sensitivity test procedure 600 begins by the technician initiating the procedure (step 602). This can be as simple the technician pressing a "start button" on the graphical user interface 160, or by the technician setting forth all of the individual testing parameters and pushing a "start test" button. The microprocessor 210 retrieves the desired bit error rate from memory (step 604), whether the desired BER is a default BER or a BER that has been previously input by the technician. The control unit 158 controls the optical transmitter 150 to transmit at an initial power level (step 606). This may be a parameter set by the technician, or a predefined default parameter. Alternatively, the control unit 158 may selectively control the optical attenuator 152 to increase or decrease the amount of optical attenuation in order to output a desired optical power level. The optical power monitor 154 measures the output of the optical transmitter 150 (step 608) and the optical receiver measures the number of bit errors at that transmitted power lever (step 610).

It is noted that the actual measured power level need not to be exactly the same as the desired power level. In this regard, it is useful to ensure that the optical testing unit accurately measures the number of errors at the current power level. The relationship between the actual power level and the number of errors measured at that actual power level is important. Because the sensitivity test procedure 600 is an iterative process of a finite number of iterations that seeks to determine an optical power level at which a certain bit error rate has been achieved, the individual power level measurements which are made in order to ultimately achieve the sensitivity are merely indicators of whether the optical power level should be increased or decreased.

Accordingly, the optical receiver 156 measures the number of bit errors at that power level (step 610). The control unit 158 then compares the desired BER to measured BER (step 612). If it has been determined that the measured bit error rate is equal to the desired bit error rate (step 614), the sensitivity of the DUT has been found and the control unit 158 stores the current power level in memory 254 and/or outputs the current power level to the graphical user interface 160 as the sensitivity value (step 622). The sensitivity test procedure 600 is then terminated.

If the measured BER is not equal to the desired BER, the control unit 158 then determines whether the measured BER is greater than the desired BER (step 616). If so, the optical power level is increased (step 620) and steps 608–614 are repeated. If the measured BER is not greater than the desired BER, the control unit 158 decreases the optical power level (step 618) and then steps 608–614 are repeated. Although not shown, if desired, sensitivity procedure 600 can display sensitivity measurements in progress to graphical user interface 160.

The sensitivity test procedure 600 provides a simple and effective method for automatically measuring the sensitivity of an optical component.

In addition to determining the sensitivity of an optical component, the optical testing unit of the present exemplary embodiment may also be used to determine whether a measured sensitivity meets or exceeds nationally or internationally recognized optical standards. This provides the technician with an additional tool for comparing the particular component to objective norms. Usefully, the "success criteria" such as the sensitivity and the desired BER are previously stored in memory 254, such as in standard success criteria module 258. The criteria may be downloaded into the memory 254 via a plurality of different methods, which will not be described in detail. Such methods may include providing external control port 101, (as shown in FIG. 1), which permits LAN interconnectivity and/or connectivity to the World Wide Web. Other interfaces such as a CD drive, floppy disk drive or other information storage and/or input/output devices may be used to provide a set of success criteria for each standard.

Figure 7:
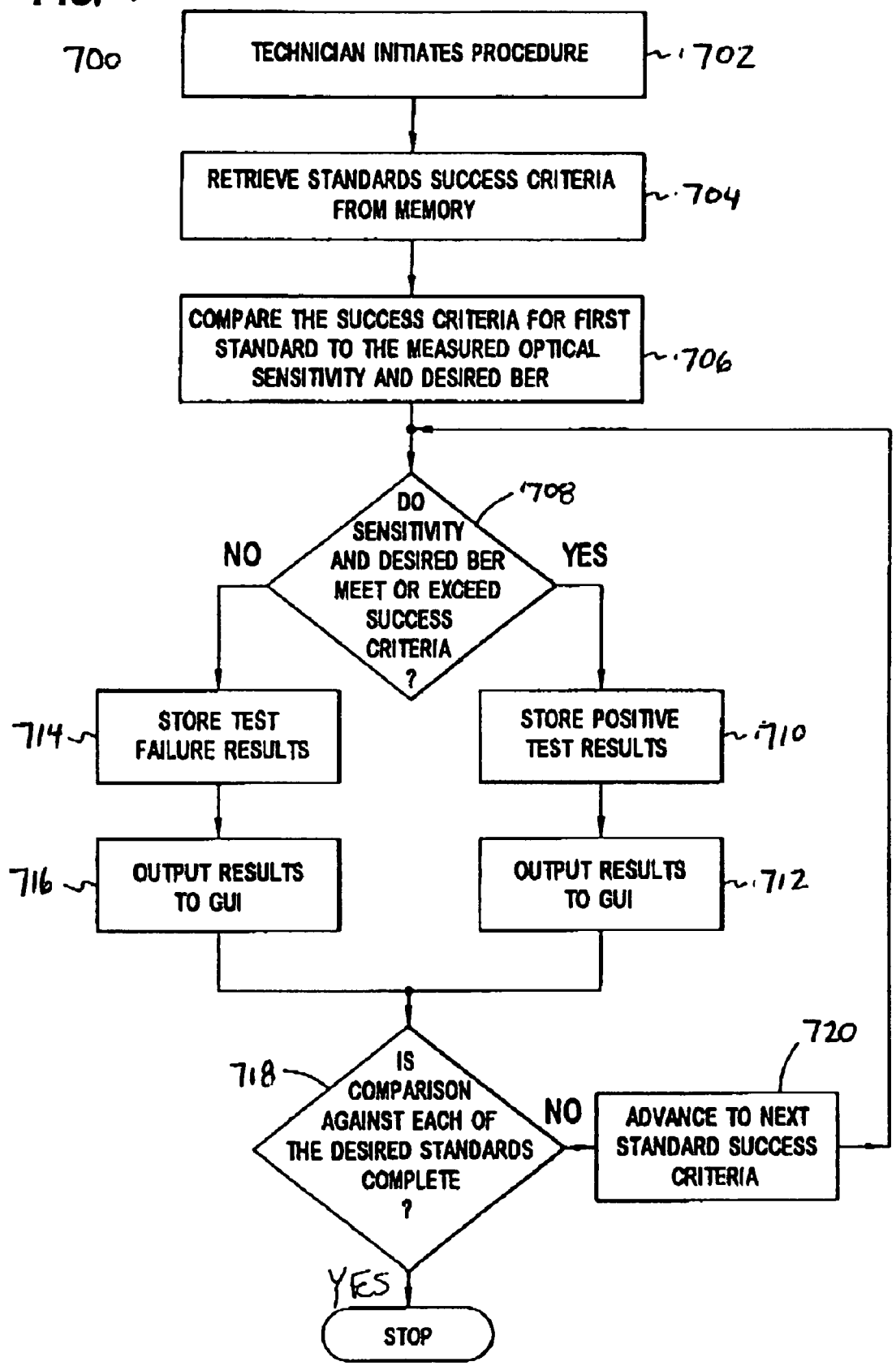
FIG. 7 is a flow chart of a standard comparison procedure in accordance with an exemplary embodiment of the present invention.

Once the success criteria are stored in memory, the procedure for comparing the sensitivity of the optical component to standard success criteria may be implemented as shown in FIG. 7. The standard comparison procedure 700 as it will be hereinafter referred to is shown in the flow diagram on FIG. 7. It should be noted that as with the sensitivity test procedure 600, the standard comparison procedure 700 may be fully automated, whereby it is automatically begun following the completion of the sensitivity procedure 600 or initiated by the technician simply pushing a button, and the control unit 158 fully carries out the standard comparison procedure 700 against all known standards (e.g., those standards stored in memory 254). Alternatively, the standard comparison procedure 700 may be selectively automated, whereby the technician may input the identification for one or more standards against which the sensitivity should be compared to and only those selected standards are compared to the measured sensitivity.

The standard comparison procedure 700 begins by the technician initiating the procedure (step 702). As mentioned above, this can occur automatically upon completion of the sensitivity procedure, can be as simple as the technician pushing a "start button" on the graphical user interface 160, or can start by the technician setting forth all of the standards against which the sensitivity will be tested and pushing an appropriate "start button". The control unit 158 retrieves the standard success criteria from memory 254 (step 704). The control unit 158 then compares the success criteria for a standard to the measured sensitivity and desired BER (step 706). The optical testing unit then determines whether the sensitivity and desired BER meet or exceed the success criteria (step 708) for that standard. If so, the control unit 158 stores the positive test result in memory 254 (step 710), or optionally output the result to the graphical user interface 160 (step 712), or both.

Alternatively, if the sensitivity and the desired BER do not meet or exceed the success criteria for that standard, the control unit 158 stores test failure results in memory 254 (step 714) and optionally outputs the test failure result to the graphical user interface 160 (step 716). The control unit 158 then determines whether there are more standard success criteria against which the DUT's sensitivity should be compared (step 718). If so, the control unit 158 advances the comparison to the next set of success criteria (step 720) and continuously repeats steps 708–718. After all of the comparisons are complete, the standard comparison procedure 700 is then terminated.

The standard comparison procedure 700 provides a tremendously powerful tool for the technician by specifically outputting which standards the optical DUT has passed and which it has failed. Via the output control interface (101) the optical testing unit can also provide an output such that a "sticker" or success report may be printed out and kept with each optical component under tests. This further enhances the ease of use of the optical testing unit.

Figure 6:
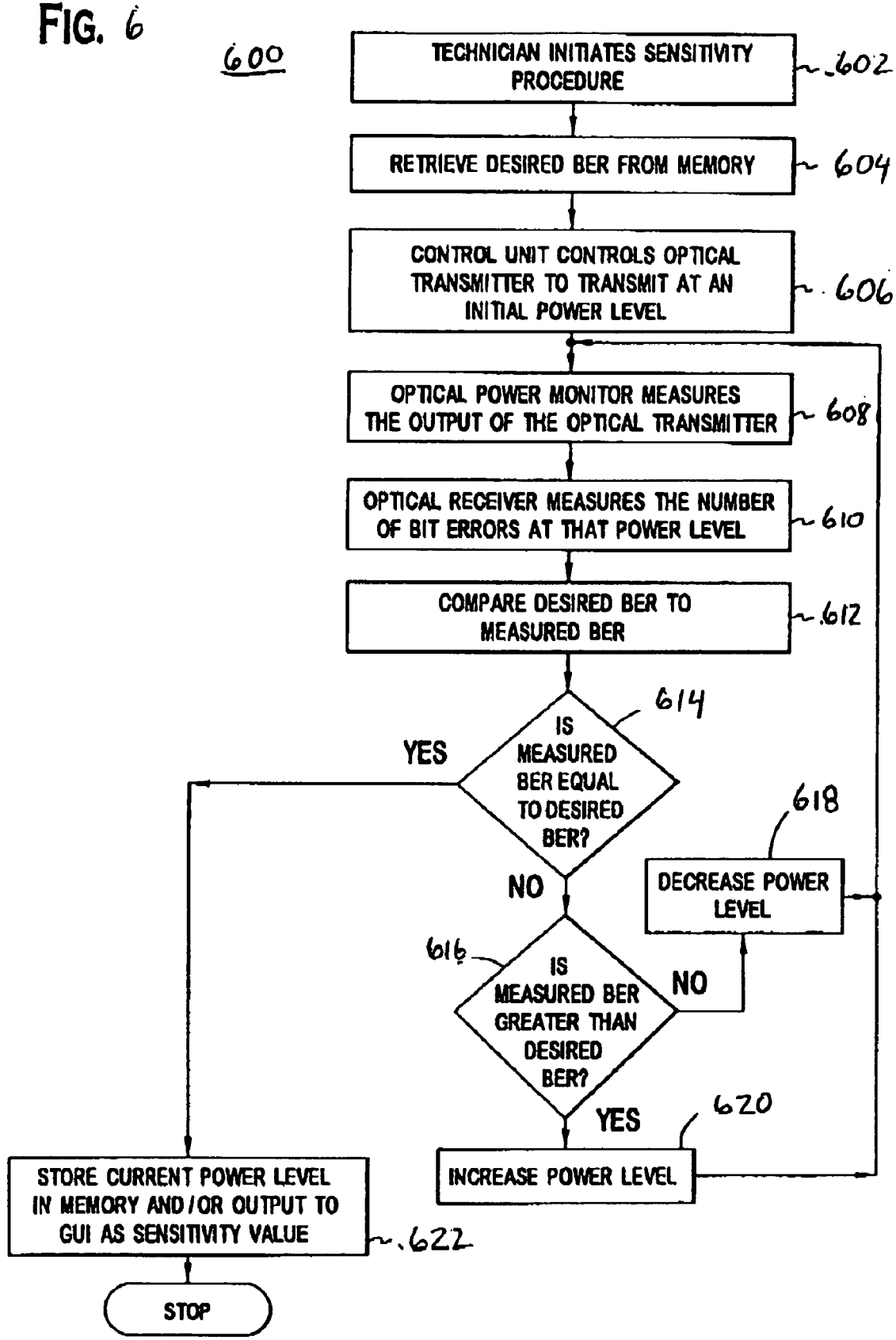
FIG. 6 is a flow chart of a sensitivity test procedure in accordance with an exemplary embodiment of the present invention.

It is noted that the steps set forth in the sensitivity test procedure 600 and the standard comparison procedure 700 may vary from the order set forth in FIGS. 6 and 7, respectively. For example, step 604 may occur after step 606. Those of skill in the art would clearly recognize that there is flexibility in the ordering of some of these steps. Additionally, some steps, (such as steps 714 and 710) may be foregone, whereby the results of the standard comparison procedure 700 are not needed to be stored. These and other variations of the illustrative processes will become apparent to one of ordinary skill in the art having had the benefit of the present disclosure.

Figure 8:
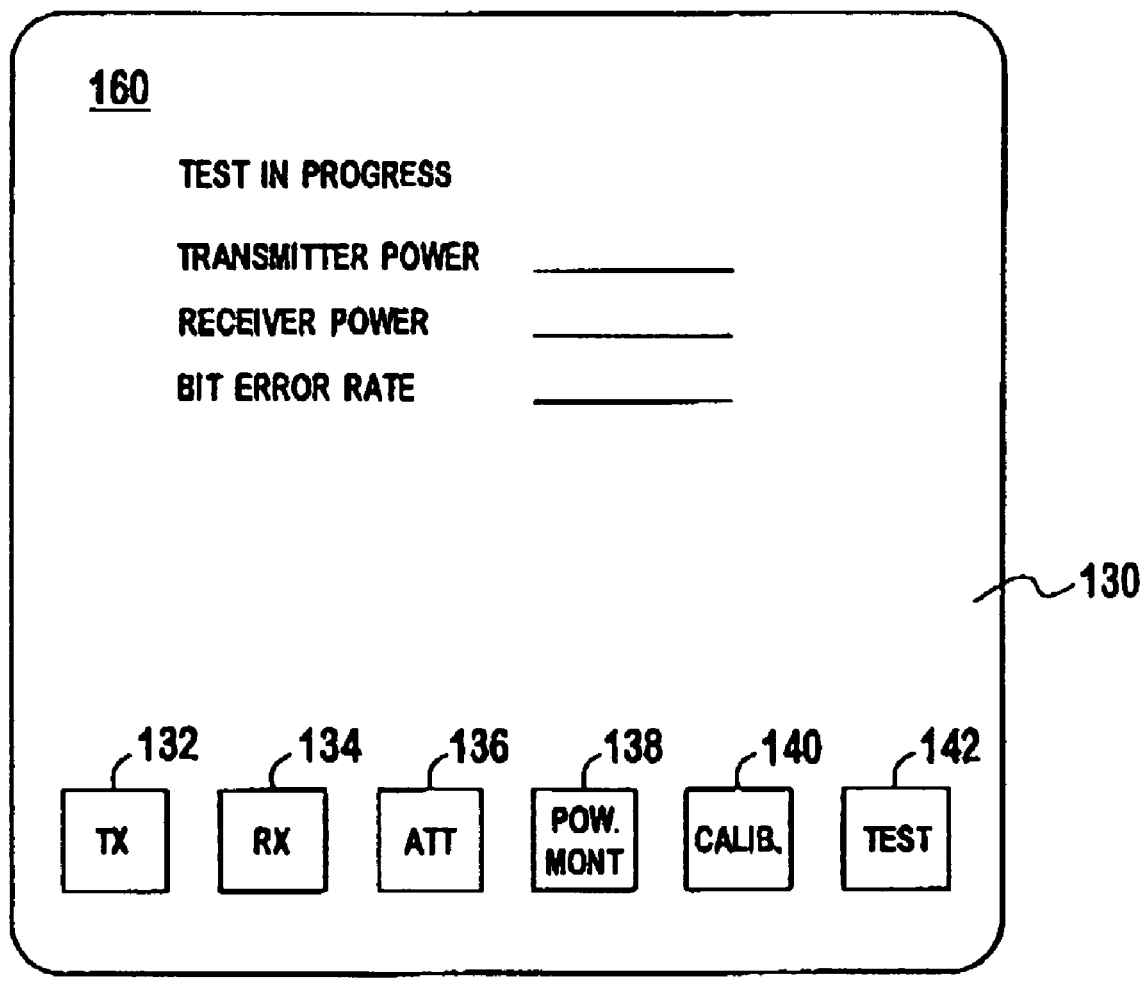
FIG. 8 shows a front view of a graphical user interface in accordance with an exemplary embodiment of the present invention.

Referring to FIG. 8, the graphical user interface 160 is shown in greater detail. Preferably, the graphical user interface 160 comprises a touch-sensitive screen 130 which will change depending upon the graphical buttons 132–140 which are selected. Alternatively, the graphical user interface 160 may comprise a CRT screen and associated mouse (not shown) for selecting the different options on the screen.

In order to make the optical testing unit as user friendly as possible, the bottom portion of the screen 130 preferably includes a discrete selection option (i.e., hereinbefore "button") for each of the transmitter 132, the receiver 134, the attenuator 136, the power monitor 138, and a separate button for the calibration procedure 140 and the test procedure 142. Of course, those of skill in the art should realize that more or fewer buttons 132–142 (such as buttons for the sensitivity procedure 600 and the standard comparison procedure 700) or hardwired buttons, may be provided as desired by the user in order to implement or control certain functions that are commonly used.

In operation, one of the buttons, 132–142 is selected, for example, the test button 142 as shown FIG. 8, to initiate the desired function. This will implement the test procedure 400 as hereinbefore described. The test results as output in steps 412, 416 may also be displayed on the screen 130.

The invention being thus described, it would be obvious that the same may be varied in many ways by one of ordinary skill in the art having had the benefit of the present disclosure. Such variations are not regarded as a departure from the spirit and scope of the invention, and such modifications as would be obvious to one skilled in the art are intended to be included within the scope of the following claims and their legal equivalents.

The invention claimed is:

1. An optical testing unit for measuring sensitivity of an optical device under test (DUT) over an operating range of the DUT comprising:
   an optical transmitter, which transmits an optical test signal that is transmitted to the DUT;
   an optical receiver, which receives an input signal from the DUT;
   a graphical user interface, which provides an interface with a user; a memory module, said memory module comprising a sensitivity module; and
   a controller, selectively coupled to said transmitter, said receiver and said graphical user interface, wherein said controller provides a central control of said transmitter, said receiver and said graphical user interface.

2. An optical testing unit as recited in claim 1, wherein said memory further comprises a calibration module, said calibration module comprising information utilized by said controller during a calibration procedure.

3. An optical testing unit as recited in claim 1, wherein said memory module further comprises a standard success criteria module, said standard success criteria module comprising information utilized by said controller to compare test results to an industry standard.

4. An optical testing unit as recited in claim 1, wherein the unit is disposed in a housing.

5. An optical test unit as recited in claim 1, further comprising an optical power monitor, which is controlled by said control unit.

6. An optical testing unit as recited in claim 5, further comprising an optical attenuator, which receives said optical test signal and selectively attenuates said test signal prior to providing an attenuated input signal to the DUT.

7. An optical test unit as recited in claim 6, wherein said control unit actively adjusts at least one of: an output power level of said transmitter; and an attenuation level of said attenuator to transmit said test signal at a desired power level as measured by said optical power monitor.

8. An optical test unit as recited in claim 7, wherein said control unit iteratively performs said adjustments.

9. A method of measuring sensitivity of an optical component, the method comprising:
   providing an optical testing unit disposed in a housing;
   providing a test optical signal as an output signal from said optical testing unit to a device under test (DUT);
   receiving an input signal from said DUT at said optical testing unit;
   measuring said sensitivity from said input signal;
   providing a control unit within said housing which controls various components in said optical test unit; and
   providing a graphical user interface (GUI).

10. A method as recited in claim 9, wherein said test optical signal is from an optical transmitter within said optical testing unit.

11. A method as recited in claim 9, wherein said input signal is received at an optical receiver within said optical testing unit.

12. A method as recited in claim 9, wherein said controller further comprises a memory module.

13. A method as recited in claim 12, wherein said memory module further comprises a sensitivity module.

14. A method as recited in claim 13, wherein said memory module further comprises a test module.

15. A method as recited in claim 13, wherein said memory module further comprises a calibration module.

16. A method as recited in claim 15, wherein said sensitivity measuring is affected after an automated calibration procedure is completed.

17. A method as recited in claim 13, wherein said memory module further comprises a standard success criteria module.

18. A method as recited in claim 9, wherein said GUI is adapted to receive manual inputs to commence and terminate the measuring.

* * * * *